May 5, 1942.  A. F. HENNINGER, JR., ET AL  2,281,579
MANUFACTURE OF GASEOUS CONDUCTION LAMPS
Filed Oct. 9, 1939  3 Sheets-Sheet 1
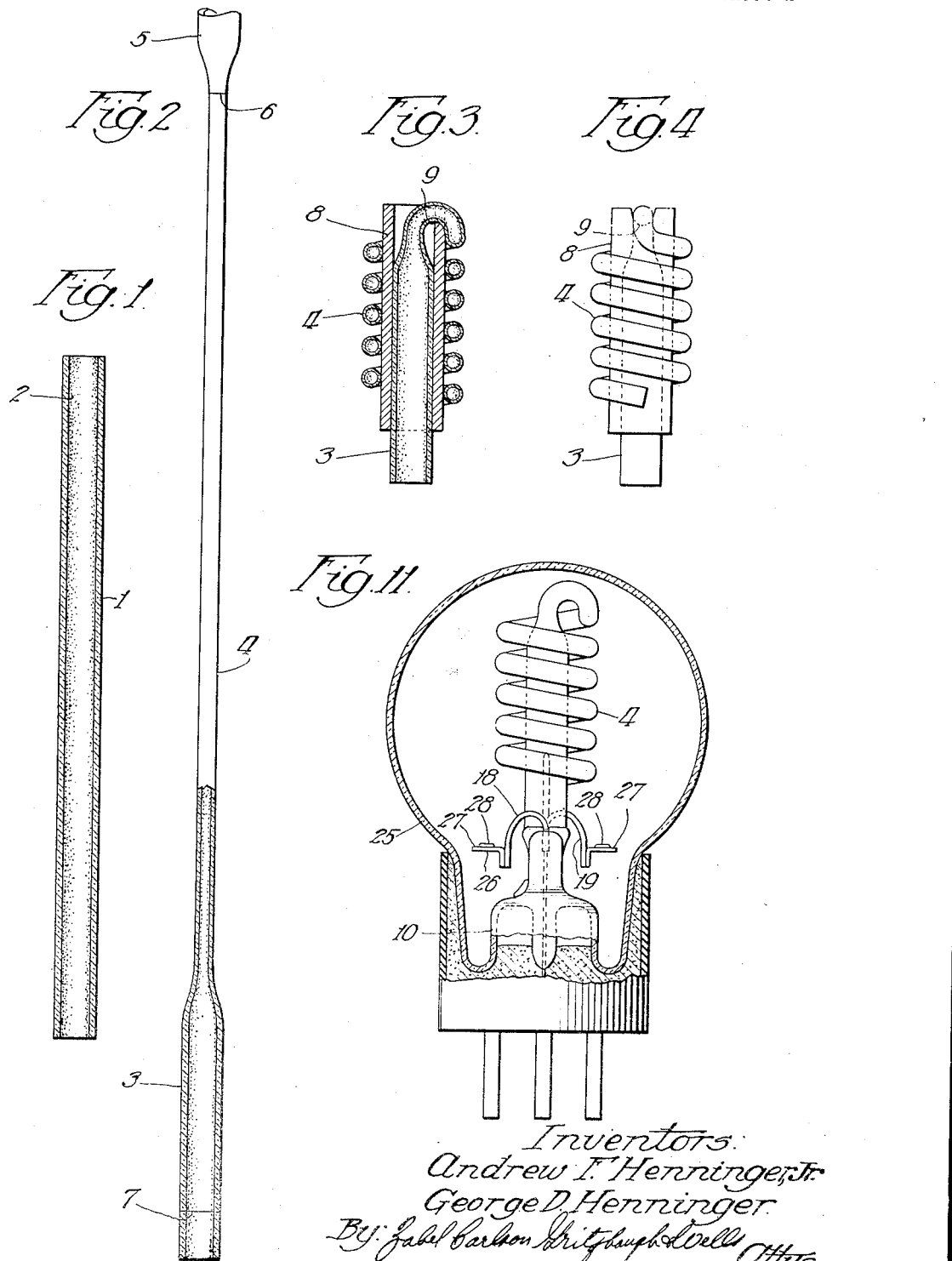

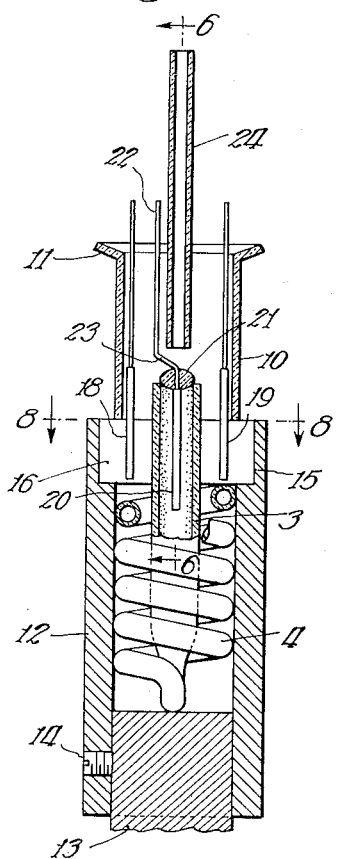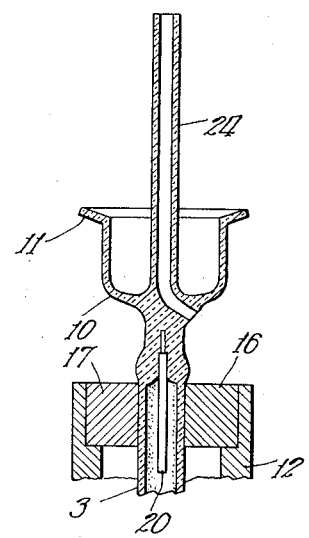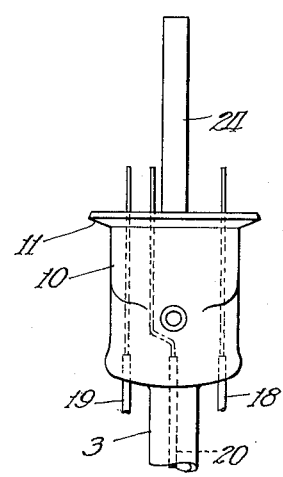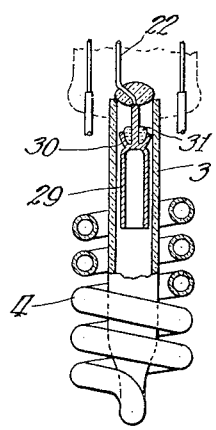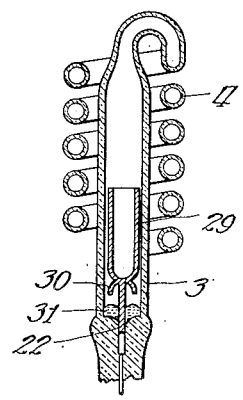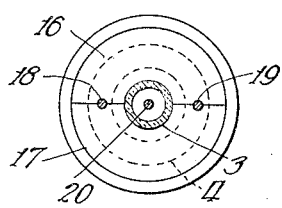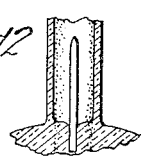

Patented May 5, 1942

2,281,579

UNITED STATES PATENT OFFICE 2,281,579

MANUFACTURE OF GASEOUS CONDUCTION LAMPS

Andrew F. Henninger, Jr., and George D. Henninger, Chicago, Ill.

Application October 9, 1939, Serial No. 298,577

9 Claims. (Cl. 176—122)

The present invention relates to the manufacture of gaseous conduction lamps. It is particularly directed toward improvements in the manufacture of such lamps as are described in our co-pending application, Serial No. 181,361, filed December 28, 1937, for Light source. This application in fact contains certain novel features in the manufacture of the light source which were disclosed in the prior application identified above, and is a continuation in part of the aforesaid application.

It is the principal purpose of this invention to provide a novel method of making gaseous conduction lamps wherein the lamp comprises a concentrated light source in the form of an elongated tortuous tube within a sealed envelope, the discharge being from an electrode within the tube to an electrode outside the tube within the envelope.

It is also a purpose of the invention to provide a novel method of forming glass tubing so that most of the length of the tubing is concentrated about a central enlarged section thereof, the central section having one end open for mounting about an electrode.

The invention contemplates also a novel method of coating the interior surface of tubing of very small diameter.

It is also a purpose of this invention to provide a novel method of mounting a unit comprising glass tubing concentrated about a central section thereof in a glass envelope.

Another purpose of the invention is to provide, in a gaseous conduction lamp of the character described, a novel method of placing mercury within the electrode receiving portion of the tubing.

It is a further purpose of the present invention to provide a novel method of mounting an electrode in a piece of glass tubing and at the same time fixing the glass tubing to the stem of an envelope which supports the electrodes and the tubing.

Other objects and advantages of the invention will appear more fully as the description proceeds, reference being had to the accompanying drawings wherein a preferred form of the invention is shown. It is to be understood, however, that the drawings and description are illustrative only, and are not to be taken as limiting the invention except insofar as it is limited by the claims.

In the drawings, Fig. 1 is a sectional view through a piece of glass tubing which is employed in making the gaseous conduction lamp;

Fig. 2 is a side view partly in section, illustrating the glass tubing after it has been heated and stretched, with a fluorescent coating thereon;

Fig. 3 is a sectional view showing the glass tubing inserted in a tubular element and bent into helical form about itself;

Fig. 4 is a view in side elevation of the structure shown in section in Fig. 3;

Fig. 5 is a fragmentary sectional view illustrating the assembly of the glass tubing with a stem and the necessary electrical leads for the completed device;

Fig. 6 is a sectional view on the line 6—6 of Fig. 5 showing the stem and the leads after the pressing operation;

Fig. 7 is a view in side elevation with a part of the tubing broken away of the unit shown in Fig. 6;

Fig. 8 is a sectional view taken on the line 8—8 of Fig. 5;

Fig. 9 is a fragmentary view, partly in section and partly in side elevation, illustrating the step of inserting mercury in the base of the tube;

Fig. 10 is a sectional view taken at right angles to Fig. 9 with the parts inverted showing their position when the pressing of the stem is completed;

Fig. 11 is a view, partly in section and partly in side elevation, of the completed lamp;

Fig. 12 is a fragmentary sectional view showing the relative positions of the electrode, the fluorescent coating and the enlarged end of the glass tubing when the assembly of the device is completed and when a small solid electrode is used;

Figure 13:
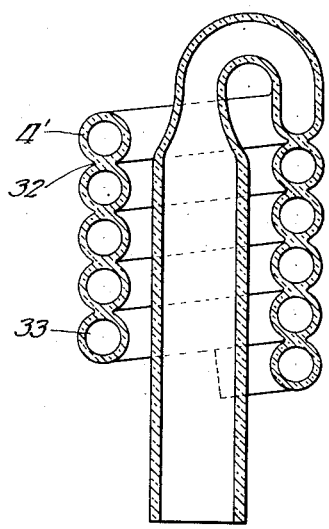
Fig. 13 is a sectional view similar to Fig. 3 with the tubular element removed and illustrating a modified form of construction wherein the several turns of glass tubing are welded together.

Referring now in detail to the drawings, Fig. 1 shows a piece of glass tubing 1 which is coated with a fluorescent material 2. The fluorescent coating is applied in any of the well-known fashions. Specifically, this coating comprises a finely divided fluorescent material such as zinc orthosilicate, calcium tungstate, magnesium tungstate, etc. The coating is applied to the glass tubing with a suitable binder.

In the manufacture of lamps such as that shown in Fig. 11, it is necessary in most cases to reduce the size of the glass tubing to a point where coating of the interior of the tubing with a uniform coating becomes exceedingly difficult. In order to obtain a coating on the small tubing, we preferably take glass tubing such as that shown at 1 with the coating already applied, and reduce it in diameter in the following manner. A substantial section 3 at one end of the tubing is held in such a manner as to avoid its stretching while the remainder of the tubing intermediate its ends, indicated at 4, is heated and stretched uniformly so as to reduce it to the desired diameter. The end 5 of the tubing opposite the end 3 will be held in a suitable holder, and of course this end will not be reduced in diameter like the part 4. The tubing is then cut off at 6 and 7 so as to provide an elongated piece of tubing having one end 3 of substantially the original diameter, the entire tubing having a coating on the interior thereof. It is found that the stretching of the tubing with the coating thereon does not seriously damage the coating when a proper binder is used. Moreover, the coating does not appear to be thinned out sufficiently to damage it. This no doubt is due to the fact that the glass contracts in diameter while it is stretching in length.

After the tubing is formed as shown in Fig. 2, the large end 3 is inserted in a tubular forming element 8 which has a round seat 9 in one end thereof. The free end of the portion 3 is extended well below the tubular element 8. The element 8 and the tubing are then heated and the reduced portion 4 of the tubing is concentrated about the element 8 by winding it in helical form so that the turns thereof are closely spaced and out of contact with each other. The central portion 3 of the glass tubing thus has the portion 4 wound about it in the form of a coil. This concentrates a considerable length of tubing within a very small volume of space and at the same time provides a central tubular section of substantial diameter for mounting purposes.

Referring now to Fig. 5 in particular, the finished unit of glass tubing is shown in the stage of being assembled with the necessary electrical leads for the electrodes and the stem by which the glass tubing is mounted in a glass envelope. A glass sleeve 10 having a flaring portion 11 at one end is utilized to form the stem and to form the means of mounting the stem in an envelope. The glass tubing is mounted in a holder 12 which is secured upon a rotatable stem 13 by a set screw 14. The helical reduced portion 4 of the tubing unit fits closely enough in the holder 12 to maintain the central portion 3 of the tubing unit in upright position. In addition, the holder 12 has a shoulder 15 at the top thereof which shoulder is adapted to receive two semicircular plates 16 and 17 which are adapted to fit closely about the portion 3 of the glass tubing. The plates 16 and 17 also position two electrical leads 18 and 19 which are subsequently used for electrode mounting. These leads are, of course, of a suitable metal that can be sealed in glass. One example of such a metal is that sold under the trade name "Duomet."

An electrode 20 is set in the open end of the portion 3. This electrode 20 has a glass bead 21 mounted on its lead 22, and the lead is bent, as shown at 23, just above the glass bead. In this way, the electrode 20 is centrally supported within the tubing portion 3. An exhausting tubing 24 is then supported by any suitable means, not shown, above the open end of the tubing portion 3. The parts assembled as described and as shown in Fig. 5 may be rotated, and heat is applied to the sleeve 10 so as to heat it up to a point where the glass may be compressed to complete the stem. The tube 10 is then compressed upon the leads 18 and 19 and upon the upper end of the tubing portion 3. Air pressure is applied to the tube 24 so as to cause it to blow out at its lower end through one side of the compressed glass stem. The resulting assembly appears as shown in Figs. 6 and 7. The glass envelope 25 is then sealed to the flared end 11 of the tube 10. However, before this is done two electrodes 26 and 27 are attached to the leads 18 and 19. These electrodes may have suitable clean-up material thereon, as indicated at 28. After the assembly is completed, it is only necessary to process the tube in the usual fashion to put it in workable shape.

When fluorescent materials are used within the tube 1, it is necessary to have mercury vapor in order to obtain the best excitation of the fluorescent materials. The mere placing of mercury or mercury vapor in the glass envelope 25 does not appear to be effective. We have found that if we place the mercury in the enlarged portion 3 of the concentrated tubing, the best results are obtained. The spiral portion 4 of the glass tubing makes it difficult to get mercury into the portion 3 and it is thus necessary to insert the mercury before mounting the glass tubing to the stem. In Figs. 9 and 10 we have illustrated a method whereby the mercury may be applied without difficulty. In these figures, a known cup-shaped electrode 29 is used within the portion 3 of the glass tubing. This electrode is provided with a hollow portion 30 which faces in the opposite direction to the open end of the electrode. In assembling the tubing, the hollow portion 30 is filled with mercury and the electrode is then seated in the tube portion 3, as shown in Fig. 9. After the stem has been compressed, the assembly may be inverted and the mercury which is illustrated at 31 in Fig. 9 will take the position shown in Fig. 10, that is, it will fall out of the hollow portion 30 and accumulate beneath the electrode 29 and around its lead 22.

It is found that the mercury does not get hot enough in sealing to vaporize off. Then in bombarding and pumping the tube the mercury is in the position shown in Fig. 10, that is, it is resting on the glass stem, and even though the electrode 29 gets red hot, it will not vaporize all of the mercury out of the portion 3 of the tube. It is possible to insert mercury in the base of the tube portion 3 after it is assembled, but this requires separation of the tube portion 3 from the tube portion 4, the insertion of the mercury down past the electrode 29, and subsequent sealing of the spiral portion 4 to the portion 3.

In Fig. 12 the electrode 20, the tube portion 3 and the stem are shown in section to illustrate how a part of the tube and the fluorescent material are actually embedded in the stem by the sealing operation. The same action takes place, of course, whether a point electrode such as is shown in Fig. 12 is used, or a cup electrode 28 is used.

Figure 14:
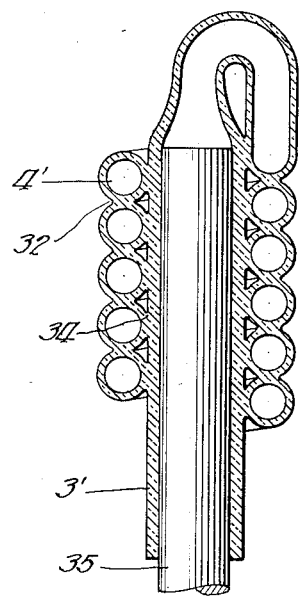
Fig. 14 is a view similar to Fig. 3 illustrating a modified construction wherein the several turns of tubing are united to each other and to the central portion of tubing.
Figure 15:
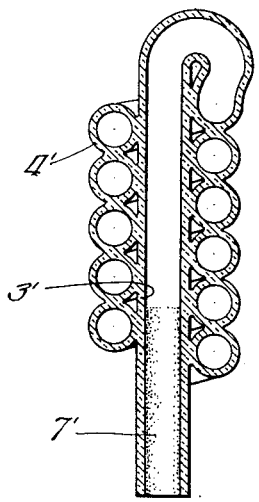
Fig. 15 is a view similar to Fig. 14 where the straight central portion of tubing is of the same diameter as the turns and wherein coating is provided in that portion of the tubing which receives the electrode.

In Figs. 13, 14 and 15 we have illustrated a modified form of the invention wherein the several turns of glass tubing about the central portion are wound so closely that they touch each other. In Fig. 13 the turns 4' are shown as fused together at 32. In making this form of the invention, the tubular member 8 is used, but the coils of tubing are wound closely together. The coils are then heated sufficiently that they fuse together into one mass of glass with a spiral passage 33 extending throughout the mass.

It is sometimes desirable to decrease the total volume of the glass tubing by placing the turns 4' in direct contact with the central straight portion 3' of the tubing. Fig. 14 illustrates how this may be accomplished. In this figure, the turns 4' are fused together at 32, the same as in Fig. 13, and the turns are also fused to the central portion 3' of the tubing, as indicated at 34. In order that the tubing may be made in this fashion, a form 35 is inserted within the central portion 3' so that its wall will not collapse. The tubing is then wound about the central portion and the form is removed after which sufficient heat is applied to fuse the turns and the central tubing together. If the tubing has a tendency to collapse in the fusing, the form 35 may of course be used to sustain the tubing during the fusing operation.

The central tubing 3' may be made of the same size as the turns 4', as illustrated in Fig. 15. Also, the coating of fluorescent material indicated at 7' may be applied to the tubing in the same manner as it is applied in the principal form of the invention. The assembly of the units shown in Figs. 13, 14 and 15 is of course the same as the assembly of the main form. It is necessary, however, in the manufacture of these modifications to carefully anneal the glass after it is fused together in order to avoid cracking.

From the foregoing description it is believed that the nature of the present invention will be readily apparent to those skilled in this art. Having thus described our invention, what we claim as new and desire to secure by Letters Patent is:

1. In the manufacture of gaseous conduction devices of the character described, a method which comprises the steps of sealing a length of glass tubing and an electrode suspended therein from one end thereof, within a mounting sleeve by collapsing the sleeve by heat and pressure upon the end of the tubing supporting said electrode, supporting a quantity of liquid mercury within said tubing below said end during the collapse of said sleeve and thereafter inverting the assembly.

2. In the manufacture of gaseous conduction devices of the character described, a method which comprises the steps of sealing a length of glass tubing and an electrode suspended therein from one end thereof, within a mounting sleeve by collapsing the sleeve by heat and pressure upon the end of the tubing supporting said electrode, and trapping a quantity of liquid mercury within the tubing around the electrode support.

3. In the manufacture of gaseous conduction devices of the character described wherein a positive column path, comprising a central portion and a portion concentrated about said central portion, is provided in a reservoir of gas, the method of providing said positive column path which comprises, mounting a length of glass tubing in an elongated tubular support with one end of the tubing extending into the tubular support a distance at least substantially equal to the desired overall length of the positive column path, heating and bending the projecting length of tubing into compact form about the tubular support, removing the tubing from said support and mounting the tubing within a gas filled envelope having electrodes therein by sealing the aforesaid end of the tubing to the envelope about one of the electrodes.

4. In the manufacture of gaseous conduction devices of the character described wherein a positive column path, comprising a central portion and a portion concentrated about said central portion, is provided in a reservoir of gas, the method of providing said positive column path which comprises, first heating and stretching a length of glass tubing so as to provide an elongated section of substantially reduced cross section integral with a shorter section of substantially the original cross section, mounting the end of the tubing having the original cross section in a tubular support with said end extending into the tubular support a distance at least substantially equal to the desired overall length of the positive column path, heating and bending the projecting length of tubing into compact form about the tubular support, removing the tubing from said support and mounting the tubing within a gas filled envelope having electrodes therein by sealing the aforesaid end of the tubing to the envelope about one of the electrodes.

5. In the manufacture of gaseous conduction devices of the character described wherein a positive column path, comprising a central portion and a portion concentrated about said central portion, is provided in a reservoir of gas, the method of providing said positive column path which comprises, first applying a fluorescent coating to the surface of glass tubing, then heating and stretching a length of the glass tubing so as to provide an elongated section of substantially reduced cross section integral with a shorter section of substantially the original cross section, mounting the end of the tubing having the original cross section in a tubular support with said end extending into the tubular support a distance at least substantially equal to the desired overall length of the positive column path, heating and bending the projecting length of tubing into compact form about the tubular support, removing the tubing from said support and mounting the tubing within a gas filled envelope having electrodes therein by sealing the aforesaid end of the tubing to the envelope about one of the electrodes.

6. In the manufacture of gaseous conduction devices of the character described wherein a positive column path, comprising a central portion and a portion concentrated about said central portion, is provided in a reservoir of gas, the method of providing said positive column path which comprises, mounting a length of glass tubing in an elongated tubular support with one end of the tubing extending into the tubular support a distance at least substantially equal to the desired overall length of the positive column path, heating and bending the projecting length of tubing into compact form about the tubular support, removing the tubing from said support and mounting the tubing within a gas filled envelope having electrodes therein by sealing the aforesaid end of the tubing to the envelope about one of the electrodes and sealing liquid mercury in said end of the tubing.

7. In the manufacture of gaseous conduction devices of the character described wherein a positive column path, comprising a central portion and a portion concentrated about said central portion, is provided in a reservoir of gas, the method of providing said positive column path which comprises mounting a length of glass tubing in an elongated tubular support with one end of the tubing extending into the tubular support a distance at least substantially equal to the desired overall length of the positive column path, heating and bending the projecting length of tubing into compact form about the tubular support, and removing the support.

8. In the manufacture of gaseous conduction devices of the character described wherein a positive column path, comprising a central portion and a portion concentrated about said central portion, is provided in a reservoir of gas, the method of providing said positive column path which comprises, first heating and stretching a length of glass tubing so as to provide an elongated section of substantially reduced cross section integral with a shorter section of substantially the original cross section, mounting the end of the tubing having the original cross section in a tubular support with said end extending into the tubular support a distance at least substantially equal to the desired overall length of the positive column path, heating and bending the projecting length of tubing into compact form about the tubular support, and removing the support.

9. In the manufacture of gaseous conduction devices of the character described, a method which comprises the steps of sealing a length of glass tubing and an electrode suspended therein from one end thereof, within a mounting sleeve by collapsing the sleeve by heat and pressure upon the end of the tubing supporting said electrode, supporting a quantity of liquid mercury within said tubing upon the electrode below that part of the tubing that is within the sleeve during the collapse of the sleeve, and thereafter inverting the assembly.

ANDREW F. HENNINGER, Jr.
GEORGE D. HENNINGER.